US012150914B1

(12) United States Patent
Bajor et al.

(10) Patent No.: US 12,150,914 B1
(45) Date of Patent: Nov. 26, 2024

(54) INFANT NUTRITIONAL DEVICE

(71) Applicants: Joseph Bajor, Little Neck, NY (US); Akshay Kamath, North Brunswick, NJ (US)

(72) Inventors: Joseph Bajor, Little Neck, NY (US); Akshay Kamath, North Brunswick, NJ (US)

(73) Assignee: Nutrivide, Inc., Lewes, DE (US)

( * ) Notice: Subject to any disclaimer, the term of this patent is extended or adjusted under 35 U.S.C. 154(b) by 165 days.

(21) Appl. No.: 18/105,825

(22) Filed: Feb. 4, 2023

Related U.S. Application Data

(63) Continuation-in-part of application No. 16/593,027, filed on Oct. 4, 2019, now abandoned.

(60) Provisional application No. 62/741,873, filed on Oct. 5, 2018.

(51) Int. Cl.
*A61J 11/00* (2006.01)
*A61J 9/00* (2006.01)

(52) U.S. Cl.
CPC ............... *A61J 11/001* (2013.01); *A61J 9/00* (2013.01)

(58) Field of Classification Search
CPC .................................. A61J 11/001; A61J 9/00
USPC .......................................................... 215/11.4
See application file for complete search history.

(56) References Cited

U.S. PATENT DOCUMENTS

| | | | |
|---|---|---|---|
| 635,226 | A | 10/1899 | Borcher |
| D33,212 | S | 9/1900 | Meinecke |
| 2,824,561 | A | 2/1958 | Richard |
| 3,610,297 | A | 10/1971 | Raaf et al. |
| 4,078,566 | A | 3/1978 | Urban, Jr. |
| 4,192,307 | A | 3/1980 | Baer |
| 4,706,827 | A | 11/1987 | Cabernoch et al. |
| 5,354,274 | A | 10/1994 | Demeter et al. |
| 5,512,047 | A | 4/1996 | Dvorak |
| D377,830 | S | 2/1997 | Lai |
| 5,601,605 | A | 2/1997 | Crowe et al. |
| D378,417 | S | 3/1997 | Panagakos et al. |

(Continued)

OTHER PUBLICATIONS

"Nutrivide: Nutrifier (1 ), 3rd Gen". Found on line Jun. 4, 2020 at facebook.com. Reference dated Apr. 24, 2018. Retrieved from https:// www.facebook.com/Nutrivide/posts/165206364154688? _ tn_ =-R.

(Continued)

*Primary Examiner* — Don M Anderson
*Assistant Examiner* — Jessica Kavini Tamil
(74) *Attorney, Agent, or Firm* — Werschulz Patent Law, LLC; Patricia P. Werschulz, Esq.

(57) ABSTRACT

An infant nutritional device for delivering pre-measured micro dosages of essential multivitamin and mineral (MVM) to supplement infant diets particularly for those infants who are risk of malnutrition. The pre-measured micro dosages of MVM are presented in a cartridge that inserts into a housing of the nutritional device. The cartridge is in fluid communication with a nipple disposed in the housing. At least one seal of the cartridge is pierced and in fluid communication with a channel in the nipple, creating an air-tight seal, minimizing any air bubbles created during sucking by an infant. The MVM is in liquid form and contains at least one fat-soluble vitamin. The infant nutritional device eliminates the worry about inaccurate measuring, loss of material through spilling and overdosing or underdosing.

17 Claims, 7 Drawing Sheets

(56) References Cited

U.S. PATENT DOCUMENTS

| | | | | |
|---|---|---|---|---|
| 5,662,684 | A | 9/1997 | Caso | |
| 5,707,353 | A | 1/1998 | Mazer et al. | |
| 5,728,137 | A | 3/1998 | Anderson-Fignon | |
| 6,110,193 | A | 8/2000 | Chen | |
| D441,452 | S | 5/2001 | Johansen et al. | |
| 6,818,162 | B1 | 11/2004 | Hoffman et al. | |
| D630,334 | S | 1/2011 | Paige | |
| 7,984,817 | B1 | 7/2011 | Everett | |
| 8,568,450 | B2 | 10/2013 | Stewart | |
| 8,651,108 | B2 | 2/2014 | Albano | |
| 9,050,244 | B2 | 6/2015 | DeLaurier | |
| D739,540 | S | 9/2015 | Almonte | |
| 9,452,109 | B2 | 9/2016 | Sheikh et al. | |
| 9,925,145 | B2 | 3/2018 | Hübinette et al. | |
| 9,974,714 | B1 * | 5/2018 | Middleton ............ | A61J 7/0053 |
| D836,786 | S | 12/2018 | Laskowski et al. | |
| D840,044 | S | 2/2019 | Rard et al. | |
| D841,822 | S | 2/2019 | Hagenauer | |
| D908,896 | S | 1/2021 | Bajor et al. | |
| 2009/0314734 | A1 | 12/2009 | Pfenniger et al. | |
| 2012/0022446 | A1 | 1/2012 | Desai et al. | |
| 2012/0035655 | A1 | 2/2012 | Trocki | |
| 2013/0098861 | A1 | 4/2013 | Lair et al. | |
| 2014/0144865 | A1 | 5/2014 | Last | |
| 2015/0173561 | A1 | 6/2015 | Foster | |
| 2016/0074287 | A1 | 3/2016 | Wang | |
| 2017/0290745 | A1 | 10/2017 | Wiesman et al. | |
| 2017/0360846 | A1 | 12/2017 | Martinsen et al. | |
| 2019/0133889 | A1 | 5/2019 | Roe et al. | |
| 2020/0022872 | A1 | 1/2020 | Touati | |
| 2020/0093706 | A1 | 3/2020 | Larry | |

OTHER PUBLICATIONS

"Nutrivide: Nutrifier (3)". Found online Jun. 4, 2020 at facebook. com. Reference dated Mar. 4, 2018. Retrieved from https:// www. facebook.com/N utrivide/photos/a .1530066653 7 4658/ 1530066553 7 4659/?type=3&theater.

Nutrivide: Nutrifier (4). Found online Jun. 4, 2020 at instagram. com. Reference dated May 1, 2020. Retrieved from https:// www. instagram.com/p/B_qVyHV JpCi/.

Tommee Tippee Breast-Like Soother. Found online Apr. 3, 2020 at instagram.com. Reference dated Feb. 4, 2019. Retrieved from https ://www. i nstag ram .com/p/Btd_ 3VrAFfs/.

* cited by examiner

INFANT NUTRITIONAL DEVICE

CROSS-REFERENCE TO RELATED APPLICATIONS

This application is a continuation-in-part nonprovisional utility application of the nonprovisional utility application, Ser. No. 16/593,027 filed in the United States Patent Office on Oct. 4, 2019 claiming priority to the provisional patent application, Ser. No. 62/741,873, filed in the United States Patent Office on Oct. 5, 2018, and claims the priority thereof and is expressly incorporated herein by reference in its entirety.

TECHNICAL FIELD

The present disclosure relates generally to an infant feeding device. More particularly, the present disclosure relates to an oral feeding device for delivering small volumes of concentrated nutrients for diet supplementation to infants.

BACKGROUND

Oral multivitamin/mineral (MVM) supplements have been in use since the early 1940s. Despite numerous advancements in the scope of MVMs offered, very little has changed with respect to their modes of delivery. The magnitude of this lack of progress in mechanistic delivery innovation becomes significant when the end users are infants.

Since infants cannot swallow tablets or capsules, the most popular method of micronutrient supplement administration calls on the use of an oral syringe or calibrated spoon. Oral syringes and calibrated spoons have proved convenient to administer small quantities of infant MVM supplements.

However, there are two major drawbacks to this method of administration. First, the markings on these devices are often hard to read and so an accurate measurement of the required amount may be challenging, especially to a caregiver unfamiliar with these devices. Inaccurate measurements lead to potential underdosing and malnutrition or overdosing and toxicity from buildup of the fat-soluble vitamins.

Second, it is very likely that there will be spills due to an infant's squirming and by the very nature of the supplement liquids themselves. For fat-soluble vitamins, the liquid is lipophilic, that is of an oily nature which has a low surface tension of the liquid, causing the liquid to drip easily.

Whenever there is a loss of liquid, it confounds the true amount of MVMs taken in by the infant. This results in the child either being underdosed or the caregiver estimating the amount lost and giving a second dose. In the case of the fat-soluble vitamins, the body bioaccumulates these vitamins leading to a potential toxic buildup.

Mixing in these oral supplements with baby food rather than direct oral dosing raises uncertainty in the actual dosage. Often the food is only partially consumed and so estimating how much MVM is consumed is next to impossible especially if the mixing is non-uniform, which would be usual for the fat-soluble vitamins.

Another popular method for administering nutrients to infants is injections. Aside from being conspicuously unappealing to the infant, they can be unsanitary, especially in developing nations, leading to infection at the injection site. More significantly, intramuscular injection administration should be done precisely, as they cannot be subcutaneous, cannot involve the vastus lateralis muscle, require the infant to remain still but simultaneously limit the restraint so the infant's fear levels are not too high. This method is not practical or desirable for routine administration of MVM, but only useful for extraordinary situations.

While these methods may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a device for delivering micro doses of multiple vitamins and minerals (MVM) to infants in a consistent dosage. Accordingly, an aspect of an example embodiment in the present disclosure provides an easy to use device that delivers pre-measured micro doses of MVM.

Another aspect of an example embodiment in the present disclosure is to provide a device for delivering a pre-measured dosage of MVM. Accordingly, the present disclosure provides a disposable cartridge containing a pre-measured dosage of MVM that inserts into the device to deliver a pre-measured dosage of MVM.

A further aspect of an example embodiment in the present disclosure is to provide a device for delivering MVM that is spill-proof. Accordingly, the present disclosure provides a nipple in the device that delivers MVM without spilling with an air-tight seal with the cartridge.

Accordingly, the present disclosure describes an infant nutritional device for delivering pre-measured micro dosages of essential multivitamin and mineral (MVM) to supplement infant diets particularly for those infants who are risk of malnutrition. The pre-measured micro dosages of MVM are presented in a cartridge that inserts into a housing of the nutritional device. The cartridge is in fluid communication with a nipple disposed in the housing. In one example embodiment, the nipple has a cannula that pierces the cartridge, creating an air-tight seal, minimizing any air bubbles created during sucking by an infant. In another example embodiment, the cartridge has a top seal and a bottom seal that are pierced by projections in the housing. The MVM is in liquid form and contains at least one fat-soluble vitamin. The infant nutritional device eliminates the worry about inaccurate measuring, loss of material through spilling and overdosing or underdosing.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 3 is an exploded view of a further example embodiment of the infant nutritional device.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
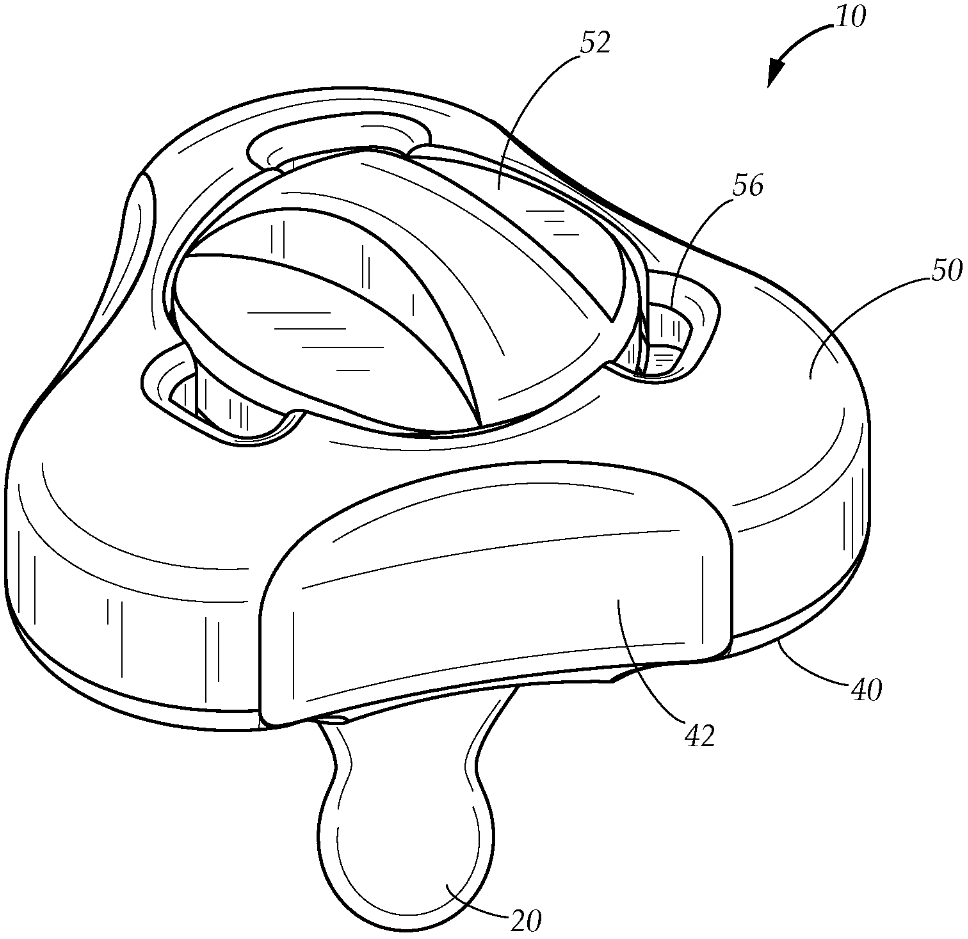
FIG. 1 is a perspective view of an example embodiment of an infant nutritional device.
Figure 2:
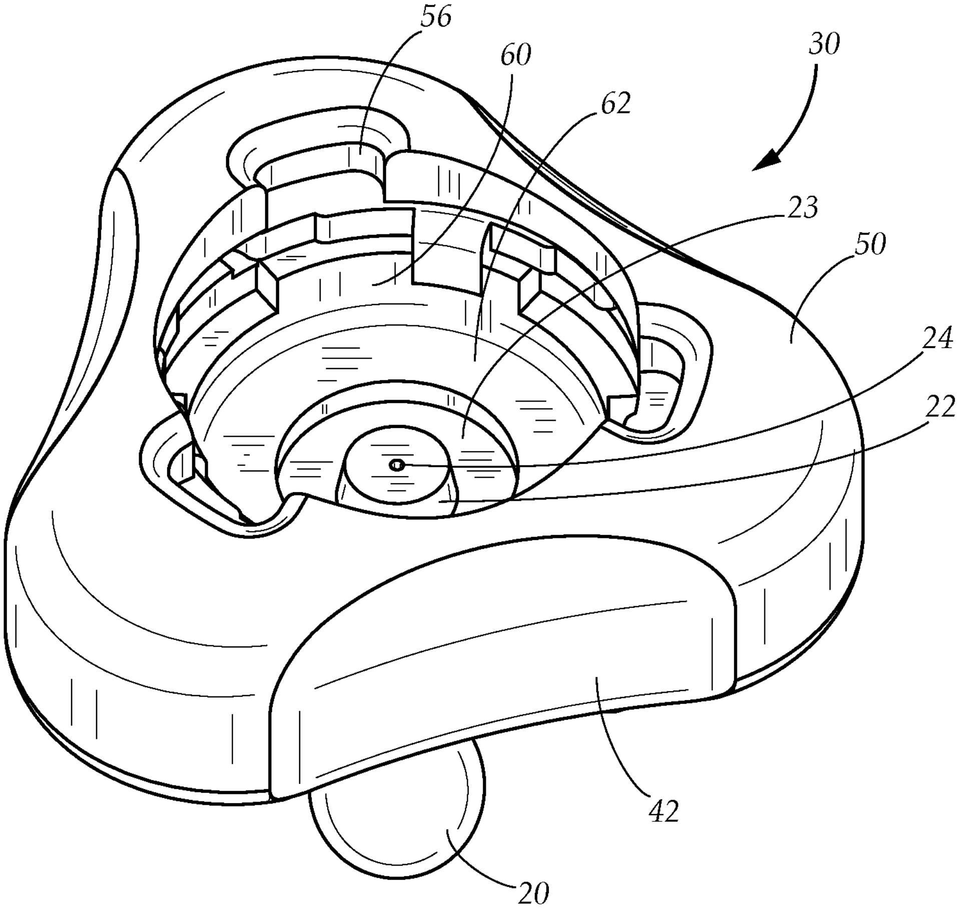
FIG. 2 is a perspective view of an interior of the example embodiment of the infant nutritional device.
Figure 3:
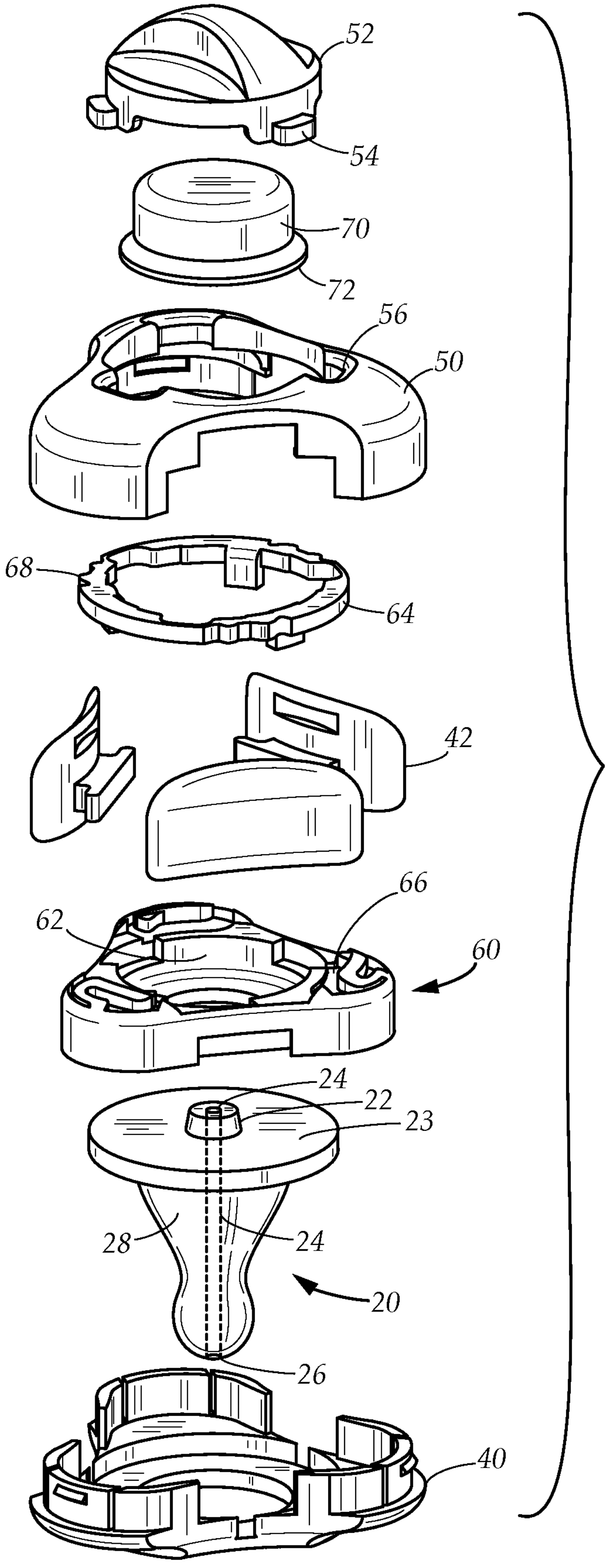
FIG. 3 is an exploded view of the example embodiment of the infant nutritional device.

FIGS. 1-3 illustrate an infant nutritional device 10 for delivering a multivitamin and mineral (MVM) supplement in a liquid form. In particular, the infant nutritional device 10 is configured to deliver pre-measured micro dosages of essential MVM to supplement infant diets particularly for those infants who are risk of malnutrition.

The infant nutritional device delivers the MVM through a nipple 20 in a non-invasive manner, taking advantage of an infant's natural sucking reflex.

The nipple 20 has at least one channel 24 in fluid communication with a cartridge 70, the at least one channel 24 in direct fluid communication with at least one delivery orifice 26.

The nipple 20 is held within a housing 30. The housing 30 connects the cartridge 70 to the nipple 20, the cartridge in fluid communication with the nipple, allowing the MVM supplement in the liquid form to enter the nipple for delivery.

The housing 30 has a mouth shield 40, a front guard 50 and a receptacle 60 therebetween. The receptacle 60 has a chamber 62 wherein the receptacle contains a cartridge 70.

The nipple 20 is held in place in the housing 30 by the mouth shield 40. The housing 30 has a locking ring 64 for locking the cartridge 70 into the chamber 62 of the receptacle 60.

The at least one channel 24 of the nipple 20 has at least one cannula 22 extending into the cartridge 70 when the cartridge 70 is held in place in the chamber 62 of the receptacle 60 by the locking ring 64 and the nipple 20 is held in place by the mouth shield 40 and the mouth shield and receptacle are secured by a plurality of clips 42. In one example embodiment the mouth shield 40, receptacle 60 and front guard 50 are a unitary piece.

The locking ring 64 has a plurality of projections 68 and the receptacle 60 has a plurality of spring-loaded channels 66, the plurality of projections of the locking ring in cooperation with the spring-loaded channel, locking the cartridge in place when the locking ring is rotated within the receptacle.

In one example embodiment, a front guard 50 joins to the receptacle 60 and a cap 52 covers the cartridge 70 when it is sitting in the receptacle, preventing the infant from playing with the cartridge. The plurality of clips 42 joined the front guard 50 to the receptacle 60 and further to the mouth shield 40. The cap 52 inserts into the front guard 50. The cap has a plurality of tabs 54 that lock into a plurality of slots 56 in the front guard 50, making the closure system child-resistant to tampering.

The cartridge 70 contains a pre-measured dosage of MVM in a liquid form. The liquid form can be a suspension, colloid, emulsion, or a solution. The liquid form is lipophilic and may contain one of more of the fat soluble vitamins such as A, D, E and K. The liquid form may also contain one or more of the essential minerals such as iron, zinc and copper. The liquid form is preferably slightly viscous, allowing the liquid form to be slowly delivered by infant sucking, taking advantage of the infant's natural sucking reflex. Preferably, the cartridge 70 provides a three-day dose for an infant. In another example embodiment, the cartridge 70 provides a daily dose. The dose is adjustable based on infant age and weight so that the cartridge contains a higher dose for older, larger infants. It is understood by those of ordinary skill in the art that the specific content of the liquid in the cartridge is not a limitation. In one example embodiment, the cartridge contains oral medication or other low volume beneficial liquids.

The cartridge 70 has an opening covered by a thin membrane 72. The thin membrane can be made from a bioplastic, foil, or a biodegradable plastic that is compatible with MVM liquid form. The at least one cannula 22 pierces the thin membrane 72 forming an internal air-tight seal between the nipple 20 and the cartridge 70 placing the cartridge in fluid communication with the nipple. The infant can suck on the nipple 20 and safely ingest the contents without generating air bubbles, reaping the benefits of nutritive sucking (similar to those from breastfeeding).

The nipple 20 has a void 28 in cooperation with the at least one channel 24 which maintains the nipple shape while sucking. Due to a smaller volume of MVM in liquid form being delivered as compared to a volume of formula usually provided, it is not possible for the material to take up the entirety of the space within the nipple 20. Limiting the liquid form flow by restricting the flow through the at least one channel 24 and avoiding the void 28, the nipple 20 delivers the smaller volume in a slower manner.

Figure 4:
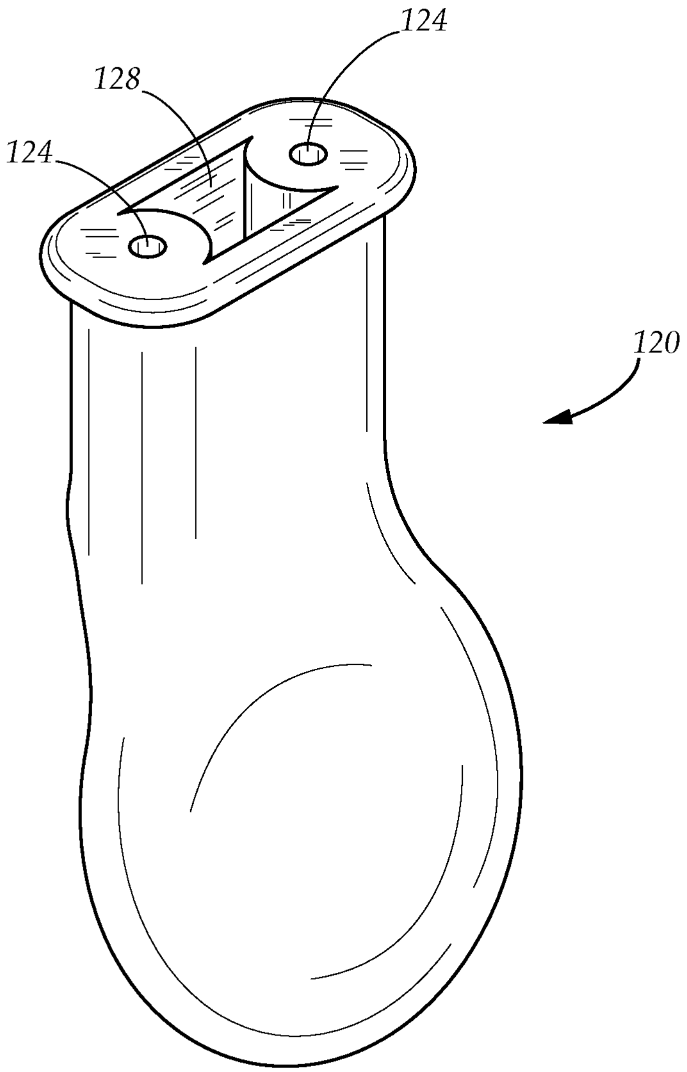
FIG. 4 is a perspective view of an example embodiment of a nipple in the infant nutritional device.
Figure 5:
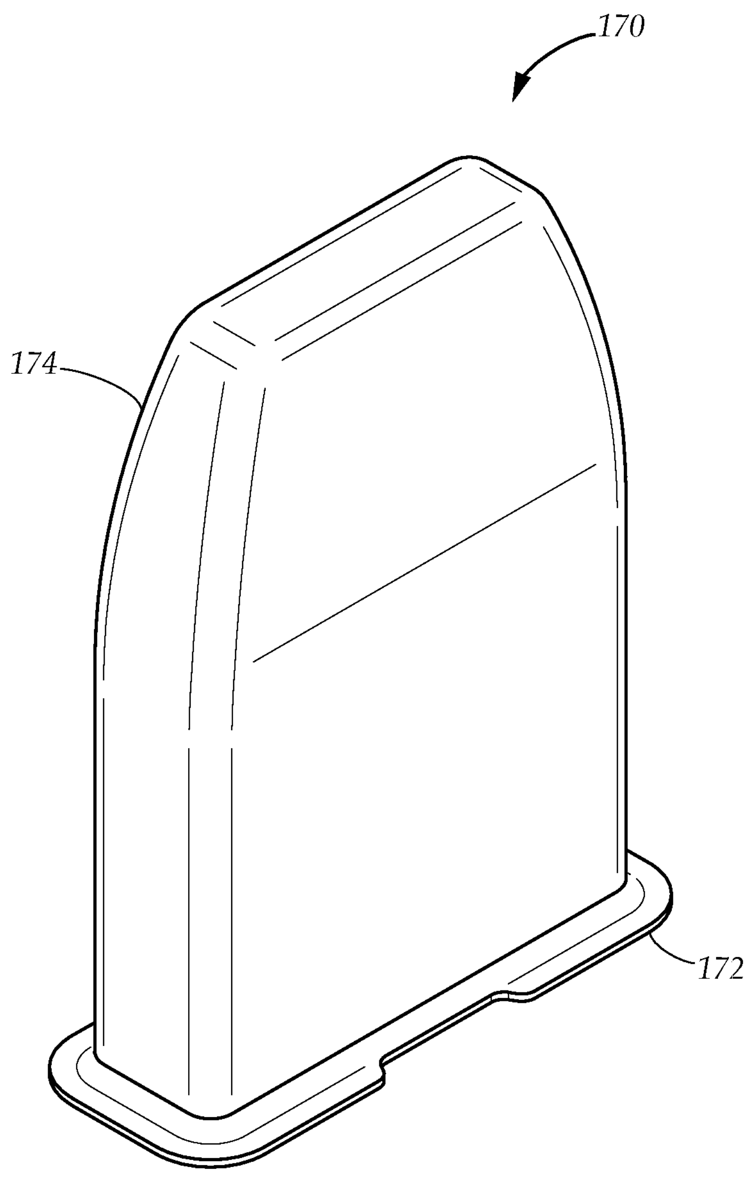
FIG. 5 is a perspective view of an example embodiment of a cartridge in the infant nutritional device.

FIGS. 4-5 illustrate another example embodiment of an orthodontic nipple 120 and a cartridge 170 usable with the housing of the infant nutritional device with modification of the locking ring 64 and the chamber 62 of the receptacle 60.

The orthodontic nipple 120 has a pair of sides 122 and a pair of channels 124, one channel on each side of the orthodontic nipple. As explained hereinabove, there is a cannula inside the channel and an orifice, (the cannula and orifice not shown in this drawing) a pair of cannulae connecting a pair of orifices to the cartridge 170 when inserted into the chamber 62 of the receptacle 60 as explained in detail hereinabove. The orthodontic nipple 120 has a void 128 between the channels 124.

The cartridge 170 is a hollow rectangular canister covered by a membrane 172. The hollow rectangular canister having a tapered bottom end 174. The tapered bottom promotes the complete flow of the contents when used with the orthodontic nipple 120.

Referring to FIGS. 1-5, a caregiver first would assemble the nipple 20 or the orthodontic nipple 120 into the housing 30. The caregiver would choose the cartridge 70 for the nipple 20 or the cartridge 170 for the orthodontic nipple 120 having the appropriate MVM for the infant's age and weight. The caregiver inserts the cartridge 70, 170 into the chamber 62 of the receptacle 60 and turns the locking ring 64 to lock the cartridge in place, the cannula 22 of the nipple 20 piercing the membrane 72, 172 of the cartridge, placing the cartridge into fluid communication with the orifice 26 of the nipple 20, 120 through the channel 24, 124 in the cannula 22. The infant nutritional device 10 inserts into the mouth of the infant, the infant reflexively sucking to empty the contents of the cartridge.

Figure 6:
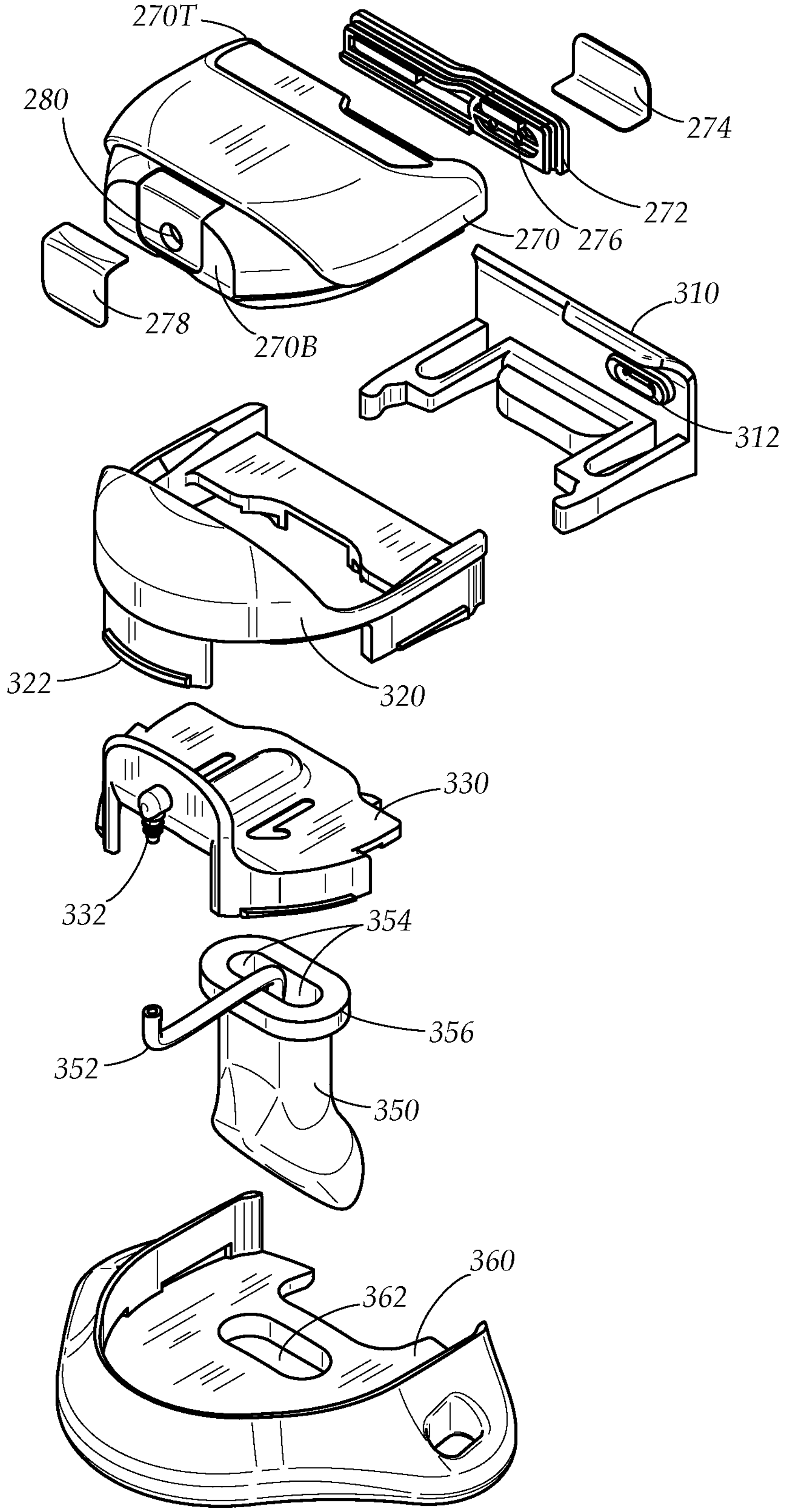
FIG. 6 is
Figure 7:
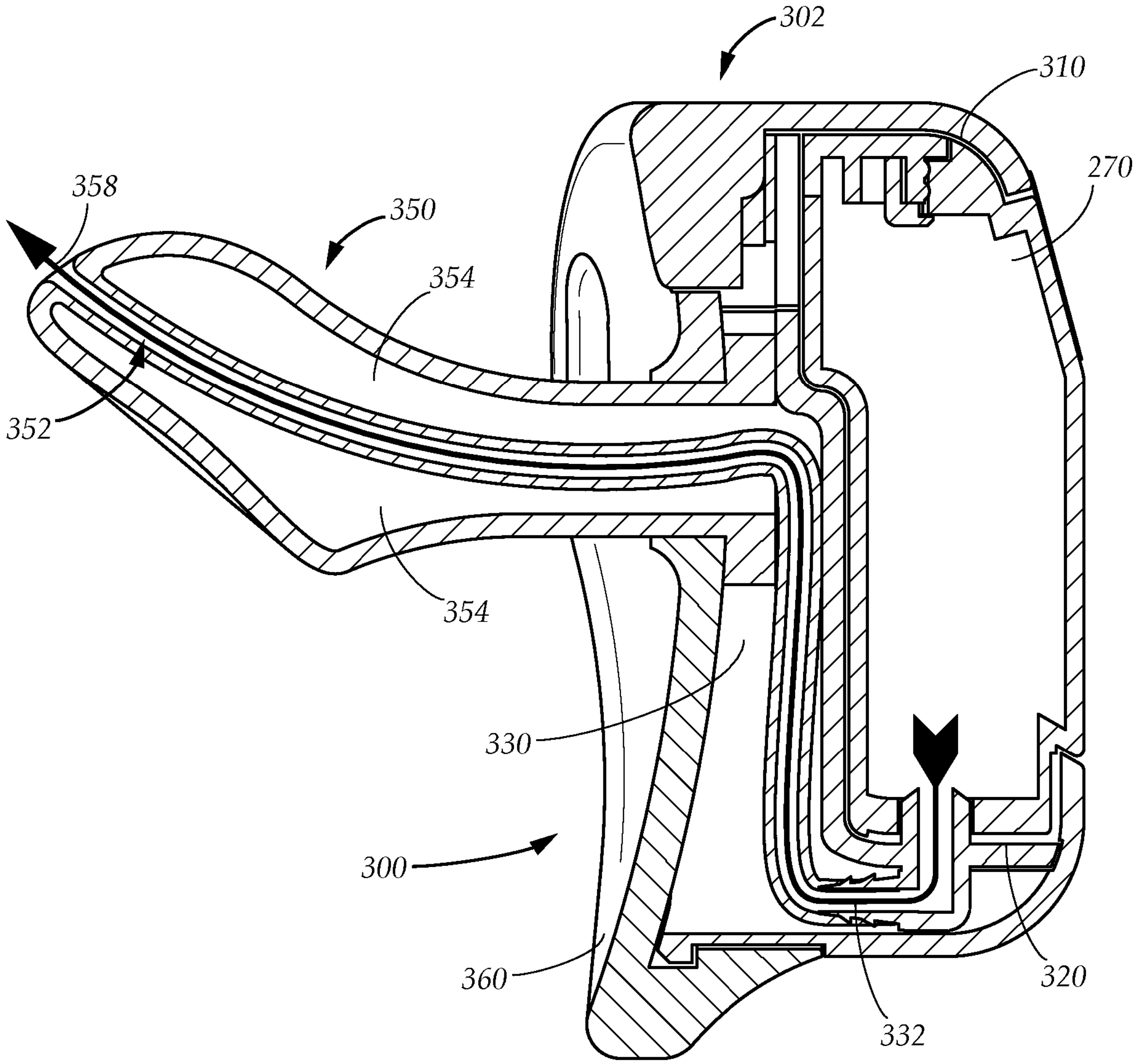
FIG. 7 is a side view of the further example embodiment of the infant nutritional device showing flow of a liquid in the nutritional device.

In FIGS. 6 and 7, a further example embodiment of the infant nutritional device 300 is illustrated. The further example embodiment comprises the cartridge 270 containing the multivitamin and mineral supplement in a liquid form or another beneficial low volume liquid, a nipple 350 and a housing 302 maintaining the cartridge 270 in fluid connection with the nipple 350. The cartridge 270 is in a vertical position relative to the nipple 360 when the nipple 350 is engaged by an infant.

The nipple 350 has a delivery orifice 358, a bottom rim 356 and a "S-shaped" channel 352 extending from the delivery orifice 358 through the nipple 350 and out the bottom rim 356, the "S-shaped" channel 352 fluidly connecting the delivery orifice 358 to the cartridge 270.

The "S-shaped" channel 352 is surrounded by a void space 354. Liquid is absent from this area, the void space 354 allowing the nipple 350 to maintain its customary shape that is comfortable to babies for natural sucking, but restricts the speed of the delivery of the liquid, which is presented in the cartridge 270 in low volume. In yet a further example embodiment the nipple 350 and the "S-shaped" channel 352 are a unitary piece.

The cartridge 270 has a top seal or first seal 272 over a sealed air opening 276 and a bottom seal or second seal 278 covering a bottom opening 280. The housing 302 has a plunger 312 adjacent to the top seal 272 that pierces the top seal 272 to expose the air opening 276 when an actuator 274 on the housing 302 is pushed and a protrusion 322 in the housing 302 adjacent to the bottom seal 278 pierces the bottom seal 278 exposing a bottom opening 280 deployed at a cartridge bottom that fluidly connects to the "S-shaped" channel 352 of the nipple 350. When the top seal 272 of the cartridge 270 is pierced, the air opening 276 deployed at a cartridge top 270T allows sufficient air to enter the cartridge 270 liquids to flow by equalizing the pressure, allowing for gravity feed. The liquids are gravity-fed when the cartridge 270 is in the vertical position relative to the nipple 350 and the nipple 350 is engaged by an infant.

The housing 302 has an elbow joint 332 directly connecting the bottom opening 280 of the cartridge 270 to the "S-shaped" channel 352 of the nipple 350.

A mouth shield 360 maintains the nipple 350 in cooperation with the housing 302 containing the cartridge 270. The mouth shield 360 has space 362 that the nipple 350 insets through before the mouth shield 360 connects to the housing 302.

The housing 302 has three sections, a top section 310 that includes the plunger 312 and the actuator 274, a bottom section 320 containing the protrusion 322 and a back section 330 containing the elbow joint 332. The three sections may be constructed separately and fitted together or constructed as a unitary piece. Neither method of construction is a limitation.

When the actuator 274 is pushed, the plunger 312 pierces the top seal 272, exposing the air opening 276 and the downward force pushes the protrusion 322 upwardly into the bottom seal 278 exposing the bottom opening 280, the air opening 276 allowing air to enter the cartridge 270, equalizing the pressure and the bottom opening 280 allowing the liquid to flow out. The liquid flows from the cartridge 270 through the elbow joint 332 into the "S-shaped" channel 352 directly to the delivery orifice 358 of the nipple 350 and into the baby's mouth. The void space 354 allows the nipple 350 to maintain its customary shape while controlling the flow of the liquid.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description refrains from repeating every possible combination of the individual steps in an unnecessary fashion. Nevertheless, the specification and claims should be read with the understanding that such combinations are entirely within the scope of the invention and the claims.

In conclusion, herein is presented an infant nutritional device. The disclosure is illustrated by example in the drawing figures, and throughout the written description. It should be understood that numerous variations are possible, while adhering to the inventive concept. Such variations are contemplated as being a part of the present disclosure.

What is claimed is:

1. An infant nutritional device for delivering a multivitamin and mineral supplement, comprising:

a cartridge containing a multivitamin and mineral supplement in a liquid form;

a nipple having a delivery orifice, a bottom rim and a "S-shaped" channel extending from the delivery orifice through the nipple and out the bottom rim, the "S-shaped" channel fluidly connecting the delivery orifice to the cartridge;

a housing maintaining the cartridge in fluid connection with the nipple the cartridge has a top seal and a bottom seal, the bottom seal when pierced exposes a bottom opening that fluidly connects to the "S-shaped" channel of the nipple.

2. The infant nutritional device as described in claim 1, wherein the nipple and the "S-shaped" channel are a unitary piece.

3. The infant nutritional device as described in claim 2, wherein the "S-shaped" channel in the nipple is surrounded by a void space, the multivitamin and mineral supplement in a liquid form absent from the void space.

4. A The infant nutritional device as described in claim 1, wherein the housing has an elbow joint directly connecting the bottom opening of the cartridge to the "S-shaped" channel of the nipple.

5. The infant nutritional device as described in claim 4, wherein the top seal of the cartridge when pierced exposes an air opening that allows sufficient air to enter the cartridge to allow the multivitamin and mineral supplement in a liquid form to flow.

6. The infant nutritional device as described in claim 5, wherein the housing has an actuator and a plunger adjacent to the top seal of the cartridge, the plunger piercing the top seal when an actuator on the housing is pushed.

7. The infant nutritional device as described in claim 6, wherein the housing has a protrusion adjacent to the bottom seal of the cartridge, the protrusion piercing the bottom seal when the actuator on the housing is pushed, exposing a bottom opening that connects to the elbow joint.

8. The infant nutritional device as described in claim 7, wherein a mouth shield maintains the nipple in cooperation with the housing containing the cartridge.

9. The infant nutritional device as described in claim 8, wherein the housing has three sections, a top section that includes the plunger and the actuator, a bottom section containing the protrusion that pierces the bottom seal of the cartridge and a back section containing the elbow joint.

10. An infant nutritional device for delivering a multivitamin and mineral supplement, comprising:

a cartridge containing a multivitamin and mineral supplement in a liquid form, the cartridge having a pair of openings, a first opening and a second opening, each opening covered by a seal;

a nipple having a bottom rim and at least one delivery orifice, a "S-shaped" channel extending from the delivery orifice through the nipple and out the bottom rim, the "S-shaped" channel fluidly connecting the delivery orifice to the cartridge; and a housing for maintaining the cartridge, the housing maintaining the cartridge and the nipple in cooperation, the housing having three sections, a top section that includes a plunger that pierces a first seal of the cartridge and an actuator, a bottom section containing a protrusion that pierces a second seal of the cartridge and a back section containing an elbow joint, the elbow joint connecting to the "S-shaped" channel of the nipple.

11. The infant nutritional device as described in claim 10, further comprises a mouth shield, the mouth shield maintaining the nipple in communication with the housing.

12. An infant nutritional device for delivering a beneficial low volume liquid, comprising:

a cartridge containing a beneficial low volume liquid, the cartridge having a pair of sealed openings;

a nipple having at least one delivery orifice, a bottom rim and a "S-shaped" channel extending from the delivery orifice through the nipple and out the bottom rim, the "S-shaped" channel fluidly connecting the delivery orifice to the cartridge; and a housing having an elbow joint, the housing maintaining the cartridge in fluid connection with the nipple, the elbow joint of the housing connecting to the "S-shaped" channel to the cartridge through one of the pair of sealed openings, the pair of the sealed openings of the cartridge having been pierced open by the housing.

13. The infant nutritional device as described in claim 12, wherein a first sealed opening of the pair of sealed openings of the cartridge containing the beneficial low volume liquid is deployed at a cartridge top and a second sealed opening of the pair of sealed openings is deployed at a cartridge bottom 270B.

14. The infant nutritional device as described in claim 13, wherein the housing further comprises three sections, a top section that includes a plunger that pierces a first sealed opening of the pair of sealed openings of the cartridge and an actuator, a bottom section containing a protrusion that pierces a second sealed opening of the pair of sealed openings of the cartridge and a back section containing the elbow joint.

15. The infant nutritional device as described in claim 14, wherein the nipple and the "S-shaped" channel are formed as a unitary piece.

16. The infant nutritional device as described in claim 15, wherein the "S-shaped" channel is surrounded by a void space in the nipple, the beneficial low volume liquid absent from the void space.

17. The infant nutritional device as described in claim 16, wherein the cartridge is in a vertical position relative to the nipple and the beneficial low volume liquid is gravity-fed.

* * * * *